United States Patent
Suzuki

(10) Patent No.: US 8,100,542 B2
(45) Date of Patent: Jan. 24, 2012

(54) ELECTRO-OPTIC DEVICE AND ELECTRONIC APPARATUS

(75) Inventor: Tomio Suzuki, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 190 days.

(21) Appl. No.: 12/541,201

(22) Filed: Aug. 14, 2009

(65) Prior Publication Data
US 2010/0091375 A1    Apr. 15, 2010

(30) Foreign Application Priority Data
Oct. 14, 2008    (JP) ................................. 2008-264876

(51) Int. Cl.
*G02B 27/00*    (2006.01)
(52) U.S. Cl. ..................... 359/601; 359/609; 359/613
(58) Field of Classification Search ................. 359/511, 359/600–614, 399, 800–819
See application file for complete search history.

(56) References Cited

U.S. PATENT DOCUMENTS

| | | | | |
|---|---|---|---|---|
| 4,208,676 A | * | 6/1980 | Berwick et al. ............... | 348/781 |
| 4,569,572 A | * | 2/1986 | Kopich ......................... | 359/601 |
| 4,865,420 A | * | 9/1989 | Schmidt ........................ | 359/601 |
| 4,991,935 A | * | 2/1991 | Sakurai ......................... | 359/804 |
| 5,408,359 A | * | 4/1995 | Ferrett et al. .................. | 359/601 |
| 5,703,605 A | | 12/1997 | Takahashi et al. | |
| 5,808,819 A | * | 9/1998 | Deitz-Bertke et al. ........ | 359/857 |
| 5,966,241 A | * | 10/1999 | Gilger ........................... | 359/609 |
| 6,024,457 A | * | 2/2000 | Kawai et al. .................. | 359/611 |
| 6,394,615 B1 | * | 5/2002 | Hill et al. ...................... | 359/608 |
| 7,386,229 B2 | * | 6/2008 | Schmidt et al. ............... | 396/534 |
| 2003/0090803 A1 | * | 5/2003 | Kusuda ......................... | 359/601 |
| 2007/0184691 A1 | * | 8/2007 | Perkins, II .................... | 439/135 |

FOREIGN PATENT DOCUMENTS

| | | |
|---|---|---|
| JP | 8-160343 A | 6/1996 |
| JP | 10-170858 A | 6/1998 |
| JP | 2004-12723 A | 1/2004 |
| JP | 2008-249869 A | 10/2008 |

* cited by examiner

*Primary Examiner* — Thong Nguyen
(74) *Attorney, Agent, or Firm* — AdvantEdge Law Group, LLC

(57) ABSTRACT

An electro-optic device includes an electro-optic panel and a light-shielding section. The light-shielding section formed on a side of a light exiting surface of the electro-optic panel and includes an inclined surface inclined toward a side opposite to the light exiting surface.

8 Claims, 5 Drawing Sheets

ELECTRO-OPTIC DEVICE AND ELECTRONIC APPARATUS

BACKGROUND

1. Technical Field

The present invention relates to an electro-optic device such as a liquid crystal device and an electronic apparatus including the electro-optic device.

2. Related Art

This kind of electro-optic device is formed such that an electro-optic panel such as a liquid crystal panel is mounted or received in a mounting case and is applicable to an electronic view finder (EVF) such as a digital camera. For example, in the configuration of an electronic view finder disclosed in JP-A-10-170858, a mirror body having a tapered inner circumferential surface is disposed between a liquid crystal panel having a small effective diameter and an ocular lens having a large effective diameter in order to allow a brightness difference between a displayed image and a periphery of the image to be small.

In the electronic view finder, when light enters the ocular lens from a side other than an ocular section (that is, a side of an observer looking into the ocular section) and reflects, it is difficult for the observer to exactly view an imaging picture on a liquid crystal panel. Therefore, a problem occurs in that it is hard to take a picture with a digital camera.

SUMMARY

An advantage of some aspects of the invention is that it provides an electro-optic device capable of preventing reflection to exactly display an imaging picture in an electronic view finder, for example, and an electronic apparatus such as a digital camera in which the electro-optic device is applied to the electronic view finder.

According to an aspect of the invention, there is provided an electro-optic device including: an electro-optic panel which has a pixel area where a plurality of pixels are arranged; and a light-shielding section which is formed on a side of a light exiting surface of the electro-optic panel along at least a part of the circumference of the pixel area and which has an inclined surface inclined toward a side opposite to the light exiting surface.

In the electro-optic device according to this aspect of the invention, light is modulated in liquid crystal as an electro-optic material, for example, in accordance with a voltage level applied in pixel unit in the pixel area of the liquid crystal panel as an example of the electro-optic panel. The light emitted from a light source and modulated in the liquid crystal exits as display light from the liquid crystal panel. When the liquid crystal device as the electro-optic device including the liquid crystal panel is applied to an electronic view finder of a digital camera, for example, an display image of the liquid crystal panel is enlarged and displayed for an observer through an ocular lens of an ocular section, for example, by the exiting display light.

In the electro-optic device according to this aspect of the invention, the light-shielding section made of a material having a light-shielding property capable of shielding light is formed along at least a part of the circumference of the pixel area on a side of the light exiting surface through which the display light of the electro-optic panel exits. The light-shielding section at least partially defines a window through which the display light from the pixel area of the electro-optic panel exits. The light-shielding section is generally formed so as to surround the pixel area.

For example, as described above, in the electronic view finder, the display light from the electro-optic panel exits through the ocular lens. However, light may come through the ocular lens from the observer toward the electro-optic panel in a direction opposite to the traveling direction of the display light. The light-shielding section protrudes so as to be inclined toward the inner circumference of the pixel area with respect to the light exiting surface of the display light from the electro-optic panel. The light-shielding section is formed so as to protrude from the light exiting surface of the electro-optic panel in the circumference of the pixel area and so as to be inclined toward the middle of the pixel area. Accordingly, light coming from the observer through the ocular lens can be shielded by the light-shielding section by reflecting the light, for example. For example, the light coming from the observer can be reflected in the light-shielding section by changing a traveling direction oriented from the outer circumference of the pixel area to the inner circumference thereof in the electro-optic panel into a direction which is different from that of the electro-optic panel in the light-shielding section inclined at a predetermined angle with respect to the light exiting surface of the liquid crystal panel and in which the light travels toward the outside of the pixel area. Accordingly, it is possible to reduce the light coming from the observer and being incident on the pixel area of the electro-optic panel.

In the electro-optic device described above, it is possible to prevent a large amount of light from being considerably reflected to the degree that the observer can view the light coming from the observer in the display area of the electro-optic panel. As a consequence, the observer using a digital camera equipped with an electronic view finder, for example, can take a picture, while viewing a more exact imaging picture in the electro-optic panel.

The electro-optic device according to the above aspect of the invention may further include a mounting case which accommodates the electro-optic panel by surrounding the circumference of the electro-optic panel. The light-shielding section may be formed as a part of the mounting case.

In the electro-optic device according to the above aspect of the invention, the mounting case may include a first holding member having an opening section surrounding the electro-optic panel and a second holding member mounted in the first holding member so as to cover the opening section. The light-shielding section may be formed as a part of the second holding member.

The electro-optic device having the above-described mounting case may further include an optical member which is accommodated in the mounting case and at least partially forms a predetermined optical system for light incident on and exiting from the electro-optic panel. The optical member may be disposed so as to be distant from the mounting case.

In the electro-optic device according to the above aspect of the invention, the light-shielding section may be inclined at an angle of 30° or less with respect to the light exiting surface.

According to another aspect of the invention, there is provided an electronic apparatus including the above-described electro-optic device (having the above-described configuration).

The operations and other advantages of the invention are apparent from an exemplary embodiment described below.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
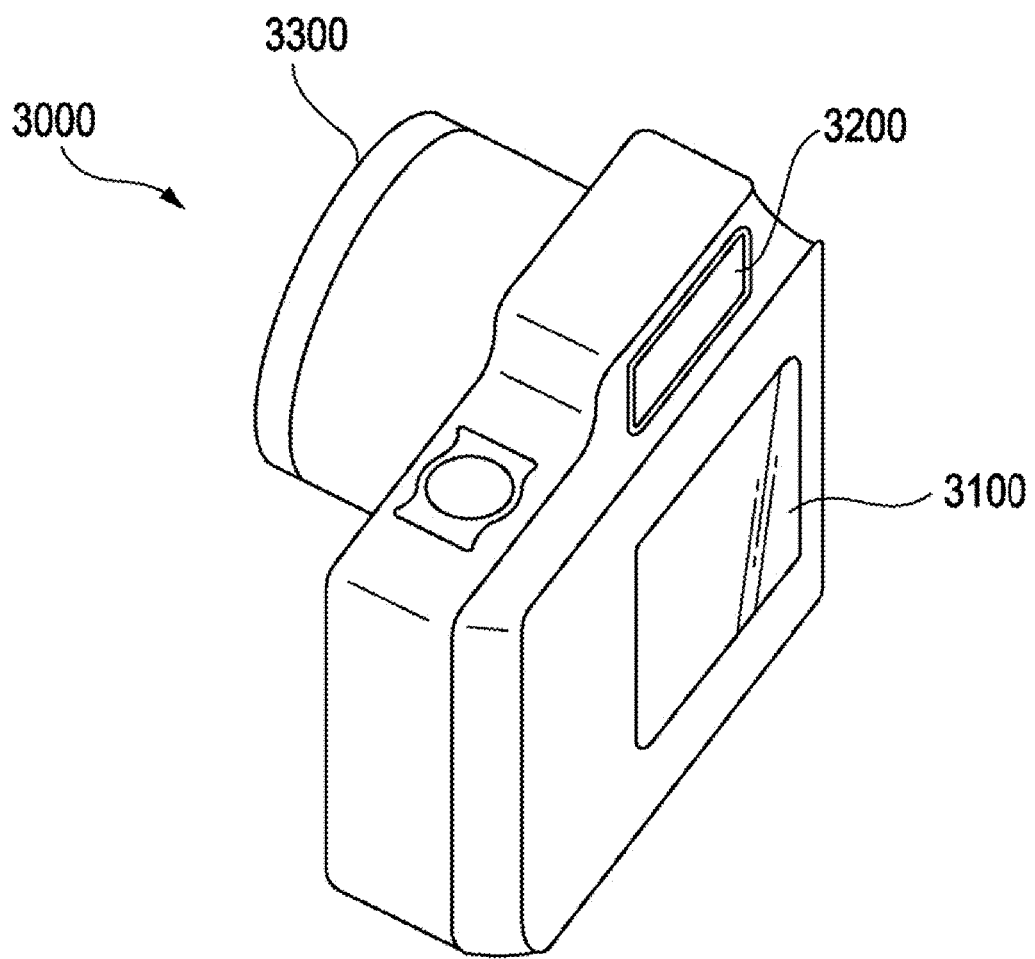
FIG. 1 is a perspective view schematically illustrating a digital camera as an example of an electronic apparatus in which a liquid crystal device is applied to an electronic view finder.

According to an aspect of the invention, there is provided an electro-optic device including: an electro-optic panel which has a pixel area where a plurality of pixels are arranged; and a light-shielding section which is formed on a side of a light exiting surface of the electro-optic panel along at least a part of the circumference of the pixel area and which has an inclined surface inclined toward a side opposite to the light exiting surface.

In the electro-optic device according to this aspect of the invention, light is modulated in liquid crystal as an electro-optic material, for example, in accordance with a voltage level applied in pixel unit in the pixel area of the liquid crystal panel as an example of the electro-optic panel. The light emitted from a light source and modulated in the liquid crystal exits as display light from the liquid crystal panel. When the liquid crystal device as the electro-optic device including the liquid crystal panel is applied to an electronic view finder of a digital camera, for example, an display image of the liquid crystal panel is enlarged and displayed for an observer through an ocular lens of an ocular section, for example, by the exiting display light.

In the electro-optic device according to this aspect of the invention, the light-shielding section made of a material having a light-shielding property capable of shielding light is formed along at least a part of the circumference of the pixel area on a side of the light exiting surface through which the display light of the electro-optic panel exits. The light-shielding section at least partially defines a window through which the display light from the pixel area of the electro-optic panel exits. The light-shielding section is generally formed so as to surround the pixel area.

For example, as described above, in the electronic view finder, the display light from the electro-optic panel exits through the ocular lens. However, light may come through the ocular lens from the observer toward the electro-optic panel in a direction opposite to the traveling direction of the display light. The light-shielding section protrudes so as to be inclined toward the inner circumference of the pixel area with respect to the light exiting surface of the display light from the electro-optic panel. The light-shielding section is formed so as to protrude from the light exiting surface of the electro-optic panel in the circumference of the pixel area and so as to be inclined toward the middle of the pixel area. Accordingly, light coming from the observer through the ocular lens can be shielded by the light-shielding section by reflecting the light, for example. For example, the light coming from the observer can be reflected in the light-shielding section by changing a traveling direction oriented from the outer circumference of the pixel area to the inner circumference thereof in the electro-optic panel into a direction which is different from that of the electro-optic panel in the light-shielding section inclined at a predetermined angle with respect to the light exiting surface of the liquid crystal panel and in which the light travels toward the outside of the pixel area. Accordingly, it is possible to reduce the light coming from the observer and being incident on the pixel area of the electro-optic panel.

Here, the angle at which the light-shielding section is inclined with respect to the light existing surface of the electro-optic panel is set in accordance with an f value of the ocular lens in the electronic view finder, for example. That is, it is preferable that the angle at which the light-shielding section is inclined with respect to the light existing surface of the electro-optic panel is adjusted in accordance with the f value of the ocular lens so as to at least partially shield the light coming from the observer and the light focused by the ocular lens in the electronic view finder. Here, "the f value" refers to a focal distance obtained by the light focused by the ocular lens. Accordingly, it is possible to shield the light focused by the ocular lens and coming toward the electro-optic panel at an incident angle defined by the f value and determined based on a focusing operation, by more surely reflecting the light from the inclined surface of the light-shielding section, for example. Moreover, it is possible to allow the reflected light to more surely travel in the direction different from that of the electro-optic panel and toward the outside of the pixel area.

In the electro-optic device described above, it is possible to prevent a large amount of light from being considerably reflected to the degree that the observer can view the light coming from the observer in the display area of the electro-optic panel. As a consequence, the observer using a digital camera equipped with an electronic view finder, for example, can take a picture, while viewing a more exact imaging picture in the electro-optic panel.

In the electro-optic device according to this aspect of the invention, the electro-optic panel may have a light-shielding film formed in a frame shape in the circumference of the pixel area. In addition, in the outer periphery of the light-shielding film outside the pixel area, the light-shielding section may at least partially define a window through which display light exits to correspond to the pixel area.

With such a configuration, an area where the image display is formed by the display light from the pixel area in the electro-optic panel is defined by the light-shielding film having the frame shape. That is, the area through which the display light can exit in the electro-optic panel is defined by the light-shielding film having the frame shape.

In the outer periphery of the light-shielding film outside the pixel area, the light-shielding section at least partially defines the window through which the display light can exit. Accordingly, by providing the light-shielding section, it is possible to display the display image in a broader area without narrowing the area through which the display light from the electro-optic panel can exit.

The electro-optic device according to the above aspect of the invention may further include a mounting case which accommodates the electro-optic panel by surrounding the circumference of the electro-optic panel. The light-shielding section may be formed as a part of the mounting case.

With such a configuration, the electro-optic panel is accommodated in the mounting case and the light-shielding section is provided in the mounting case. Accordingly, by integrally forming the light-shielding section with the mounting case accommodating the electro-optic panel, it is possible to more easily miniaturize the electro-optic device and more simply manufacture the electro-optic device.

In the electro-optic device according to the above aspect of the invention, the mounting case may include a first holding member having an opening section surrounding the electro-optic panel and a second holding member mounted in the first holding member so as to cover the opening section. The light-shielding section may be formed as a part of the second holding member.

With such a configuration, it is possible to miniaturize the electro-optic device by simplifying the configuration of the mounting case.

The first holding member has the opening section defining an opening for accommodating the electro-optic panel. In the mounting case, the electro-optic panel is accommodated in the opening so that the circumference of the electro-optic device is surrounded by the opening section of the first holding member. The second holding member formed of a plate-shaped member, for example, is mounted in the first holding member on a side of the light exiting from the electro-optic panel so as to cover the opening formed by the opening section. In this aspect, the light-shielding section is provided in the second holding member. Accordingly, in the second holding member forming a part of the mounting case, a window through which the display light from the pixel area can exit is at least partially defined and the light coming from the observer through the ocular section can be shielded. Compared to a configuration in which the light-shielding section is provided in the first holding member having a box-like shape, as described above, it is possible to simplify the configuration of the mounting case and more easily configure the mounting case by processing a part of the second holding member formed of, for example, a plate-shaped member and having a simpler configuration and forming the light-shielding section.

The electro-optic device having the above-described mounting case may further include an optical member which is accommodated in the mounting case and at least partially forms a predetermined optical system for light incident on and exiting from the electro-optic panel. The optical member may be disposed so as to be distant from the mounting case.

With such a configuration, it is possible to more effectively prevent damage or distortion from occurring because an optical member such as a polarizing plate for polarizing the light incident on or exiting from the electro-optic panel or a phase difference plate for correcting a phase difference comes in contact with the inner wall of the mounting case and thus stress is added.

In the electro-optic device according to the above aspect of the invention, the light-shielding section may be inclined at an angle of 30° or less with respect to the light exiting surface.

With such a configuration, by reflecting the light coming from the observer and incident on the light-shielding section from the inclined surface of the light-shielding section, it is possible to more surely change the traveling direction of the incident light to the direction which is different from that of the electro-optic panel and is toward the outside of the pixel area. When the inclination angle of the light-shielding section is larger than 30° with respect to the light exiting surface of the electro-optic panel, a problem occurs in that the light coming from the observer cannot be more effectively shielded by the light-shielding section or a larger amount of the reflected light travels into the pixel area even though the light is reflected by the light-shielding section. However, in the electro-optic device according to the above aspect of the invention, the light-shielding section can more surely shield the light coming from the observer.

According to another aspect of the invention, there is provided an electronic apparatus including the above-described electro-optic device (having the above-described configuration).

According to this aspect of the invention, it is possible to realize various electronic apparatuses such as a digital camera and a video camera which include an electronic view finder and with which an observer can take a picture while the observer views a more exact imaging picture.

Hereinafter, an electro-optic device according to an embodiment of the invention will be described with reference to the drawings. In addition, in the following embodiment, a TFT (Thin Film Transistor) active matrix driving type liquid crystal device will be described as an example of the electro-optic device according to the invention.

First, a digital camera as an example of an electronic apparatus according to the invention in which the liquid crystal device is applied to an electronic view finder will be described.

FIG. 1 is a perspective view schematically illustrating the digital camera according to an embodiment of the invention.

In FIG. 1, a digital camera 3000 according to this embodiment of the invention includes a photographic lens 3300, a liquid crystal monitor screen 3100, and an electronic view finder 3200. The liquid crystal device according to this embodiment is applied to the electronic view finder 3200. An imaging picture displayed on the liquid crystal device is enlarged in an ocular section. Then, an observer is able to take a picture with the digital camera 3000, while viewing the enlarged picture with the eyes.

Next, the overall configuration of the liquid crystal device according to this embodiment will be described with reference to FIGS. 2 to 6. In the accompanying drawings, in order to make the layers and elements recognizable in the drawings, the layers and elements are appropriately shown with different scales in every drawing.

First, the configuration of the liquid crystal panel provided in the liquid crystal device will be described with reference to FIGS. 2 and 3.

Figure 2:
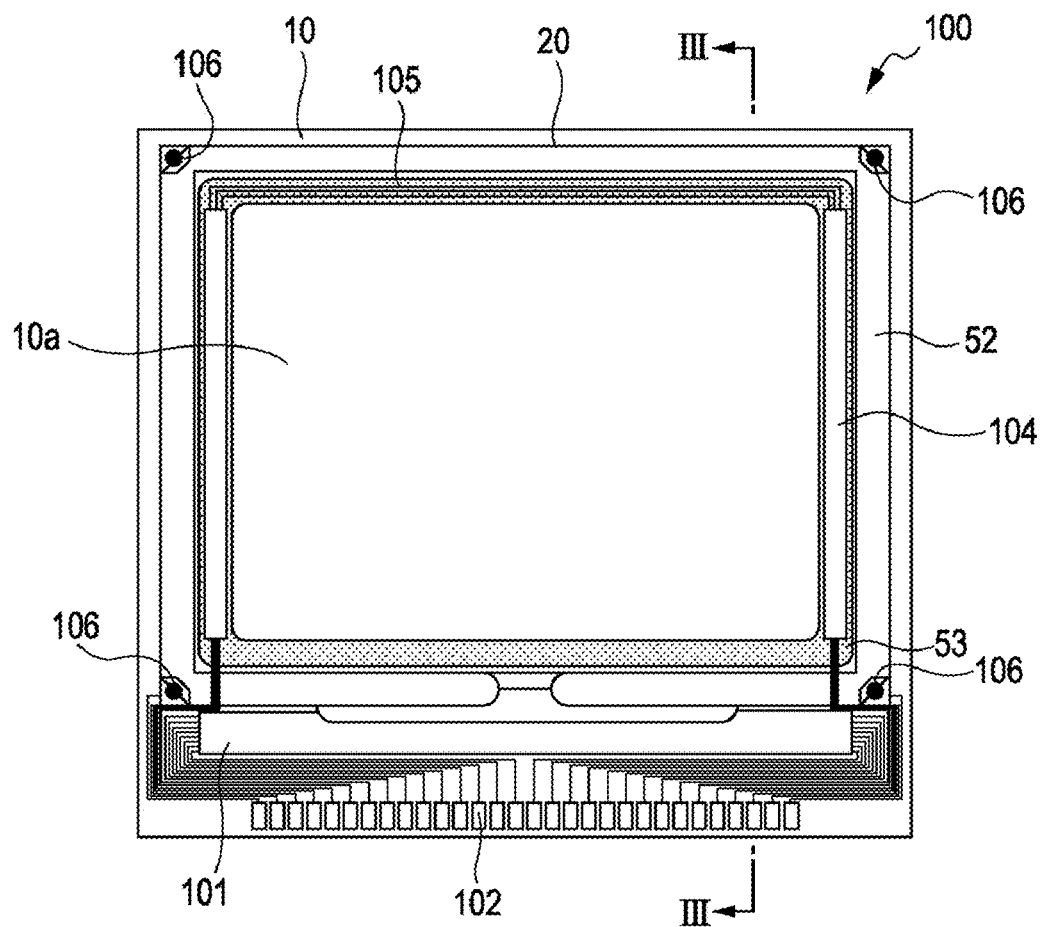
FIG. 2 is a plan view illustrating the overall configuration of the liquid crystal device.

FIG. 2 is a plan view illustrating the overall configuration of the liquid crystal panel according to this embodiment. FIG. 3 is a sectional view taken along the line III-III of FIG. 2.

Figure 3:
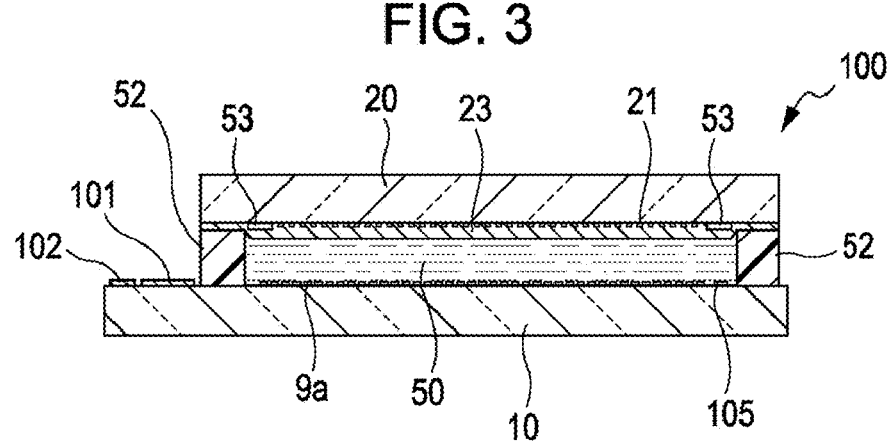
FIG. 3 is a sectional view taken along the line III-III of FIG. 2.

In FIGS. 2 and 3, in a liquid crystal panel 100 according to this embodiment, a TFT array substrate 10 and a counter substrate 20 are disposed so as to face each other. A liquid crystal layer 50 is sealed between the TFT array substrate 10 and the counter substrate 20. The TFT array substrate 10 and the counter substrate 20 are adhered to each other by a sealing member 52 which is provided in a sealing area located in the circumference of an image display area 10a as an example of "a pixel area" according to this embodiment. The sealing member 52 is made of ultraviolet curable resin to attach both the substrates to each other. In the manufacturing process, the sealing member is applied onto the TFT array substrate 10 and then hardened by radiating ultraviolet rays. In the sealing member 52, a gap material (not shown) such as glass fiber or glass bead for maintaining a gap (a gap between the substrates) of a predetermined value between the TFT array substrate 10 and the counter substrate 20 is scattered.

In FIG. 2, in the counter substrate 20, a frame light-shielding film 53 which has a light shielding property and defining a frame area of the image display area 10a are provided in parallel inside the seal area where the sealing member 52 is disposed. However, a part or the whole of the frame light-shielding film 53 may be provided as a light-shielding film included internally in the TFT array substrate 10.

In the area of the circumferential area located outside the sealing area where the sealing member 52 is disposed, a data line driving circuit 101 and external circuit connection terminals 102 are provided along one side of the TFT array substrate 10. Scanning line driving circuits 104 are provided along two sides adjacent to the one side so as to be covered with the frame light-shielding film 53. In order to connect the two scanning line driving circuits 104 provided on both sides of the image display area 10*a* to each other, a plurality of wiring lines 105 are provided along the remaining one side of the TFT array substrate 10 so as to be covered with the frame light-shielding film 53.

In the four corners of the counter substrate 20, vertical conductive members 106 are disposed between the substrates. On the other hand, in the TFT array substrate 10, vertical conductive terminals are provided in areas facing the corners of the counter substrate. With such a configuration, the TFT array substrate 10 and the counter substrate 20 are electrically conductive.

In FIG. 3, a lamination structure provided with pixel switching TFTs as driving elements and wiring lines such as scanning lines and data lines are formed on the TFT array substrate 10. A detailed configuration of the lamination structure is not shown. In the image display area 10*a*, pixel electrodes 9*a* are formed on the pixel switching TFTs and the wiring lines such as the scanning lines and the data lines. The pixel electrode 9*a* generally made of a transparent material such as ITO (Indium Tin Oxide) is formed in an island shape with a predetermined pattern in every pixel.

An alignment film (not shown) is formed on the pixel electrodes 9*a*. On the other hand, a light-shielding film 23 is formed on a surface of the TFT array substrate 10 facing the counter substrate 20. On the light-shielding film 23, counter electrodes 21 made of a transparent material such as ITO are formed so as to face the plurality of pixel electrodes 9*a*. An alignment film (not shown) is formed on the counter electrodes 21. The liquid crystal layer 50 is formed of liquid crystal in which one kind or various kinds of nematic liquid crystal are mixed. The liquid crystal layer 50 takes a predetermined alignment state between one pair of the alignment films.

Upon driving the liquid crystal panel 100, an image signal is supplied to the pixel electrodes 9*a* in every pixel and is held between the pixel electrodes 9*a* and the counter electrodes 21 for a certain time. In the liquid crystal constituting the liquid crystal layer 50, light is modulated to enable a gray scale to be displayed by varying an alignment or an order of molecule collection in accordance with a voltage level applied in this manner. In a normally white mode, transmittance of the incident light is decreased in accordance with a voltage applied in pixel unit. In a normally black mode, transmittance of incident light is increased in accordance with a voltage applied in pixel unit. On the whole, light having a contrast based on the image signal in the image display area 10*a* exits. Even though a detailed description is omitted, each pixel is driven by supplying various signals such as an image signal to the data lines or the scanning line. The pixel electrode 9*a* is controlled by the pixel switching TFT.

Even though not shown here, the TFT array substrate 10 may be provided with a sampling circuit which samples an image signal of an image signal line and supplies the sampled image signal to the data line, a precharge circuit which supplies a precharge signal having a predetermined voltage level to the plurality of data lines prior to the image signal, and an inspection circuit or an inspection pattern which inspects the quality or defect of the liquid crystal device during manufacture or in shipment, in addition to the data line driving circuit 101 and the scanning line driving circuits 104.

In the liquid crystal device according to this embodiment, the liquid crystal panel 100 described above is accommodated in a mounting case.

Figure 4:
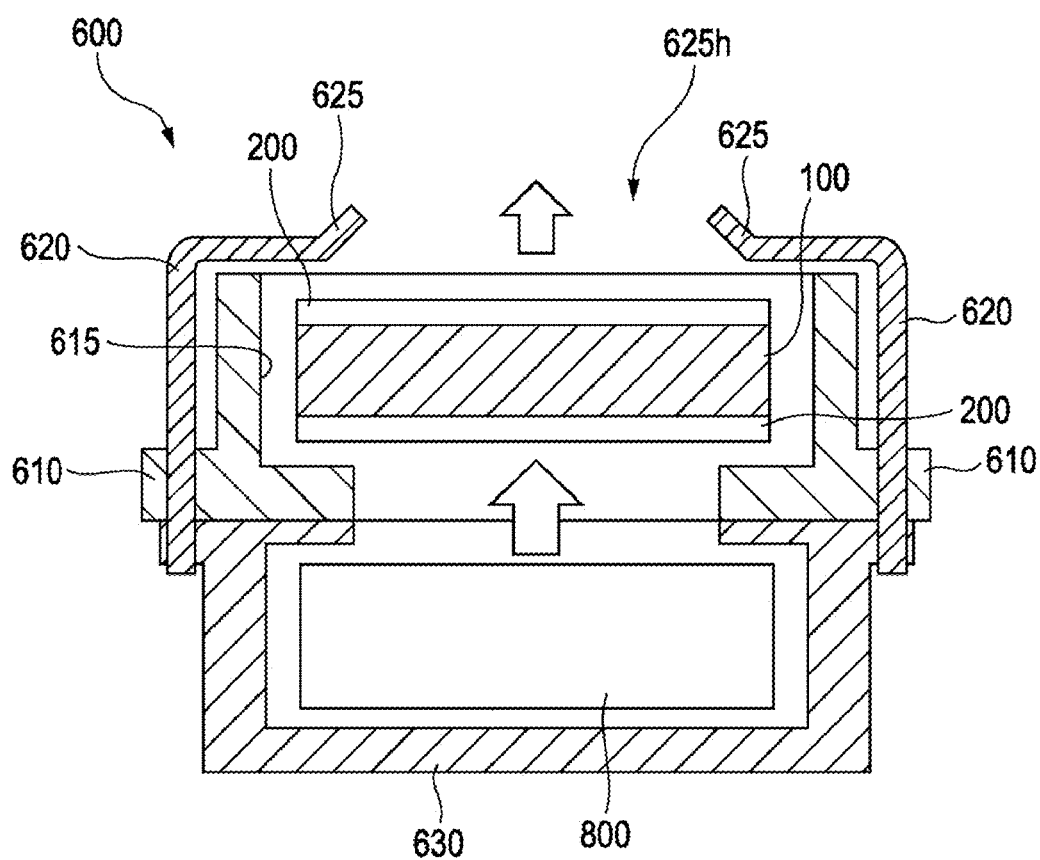
FIG. 4 is a sectional view schematically illustrating an exemplary configuration of a mounting case.

FIG. 4 is a sectional view schematically illustrating an exemplary configuration of the mounting case.

In FIG. 4, a mounting case 600 is formed by integrally connecting a frame 610 for accommodating the liquid crystal panel 100 and a backlight unit case 630 for accommodating a backlight unit 800 by a hook 620. The frame 610 is an example of "a first holding member" according to the invention and the hook 620 is an example of "a second holding member" according to the invention. Here, "the holding members" of course refer to members which directly support the liquid crystal panel 100 and also include a member, such as the other member functioning as a member for receiving the liquid crystal panel 100, which indirectly supports a member when the liquid crystal panel 100 is detached from one member, for example.

The liquid crystal panel 100 is accommodated in the frame 610 in a state where optical members 200 including a polarizing plate or a phase difference plate are provided on the surfaces (more specifically, the surfaces of the TFT array substrate 10 and the counter substrate 20 opposite to the liquid crystal layer 50 described with reference to FIGS. 2 and 3). In the joints of the frame 610 and the backlight unit case 630, a window is defined such that light emitted from the backlight unit 800 as a light source can be incident on the liquid crystal panel 100, as indicated by a white arrow of FIG. 4. Light emitted from the backlight unit 800 and modulated in each pixel of the liquid crystal panel 100 exits as display light from a window 625*h* defined by the hook 620, as indicated by the white arrow of FIG. 4.

A member forming the frame 610 is formed in a scraped shape to accommodate the liquid crystal panel 100 and thus an opening formed by the scraped shape defines an opening section 615. The circumference of the liquid crystal panel 100 is surrounded in the frame 610 by the opening section 615 to accommodate the liquid crystal panel in the opening.

The hook 620 functioning as a cover is mounted on the frame 610 having a box-like shape and no cover. The hook 620 is a plate-shaped member made of metal such as aluminum. The hook 620 is mounted on the frame 610 to cover the opening section 615 so as to face one surface of the liquid crystal panel 100 in the mounting case 600. The light-shielding section 625 forming a part of the hook 620 is formed to define the window 625*h*. The configuration of the light-shielding section 625 will be described in detail below.

Figure 5:
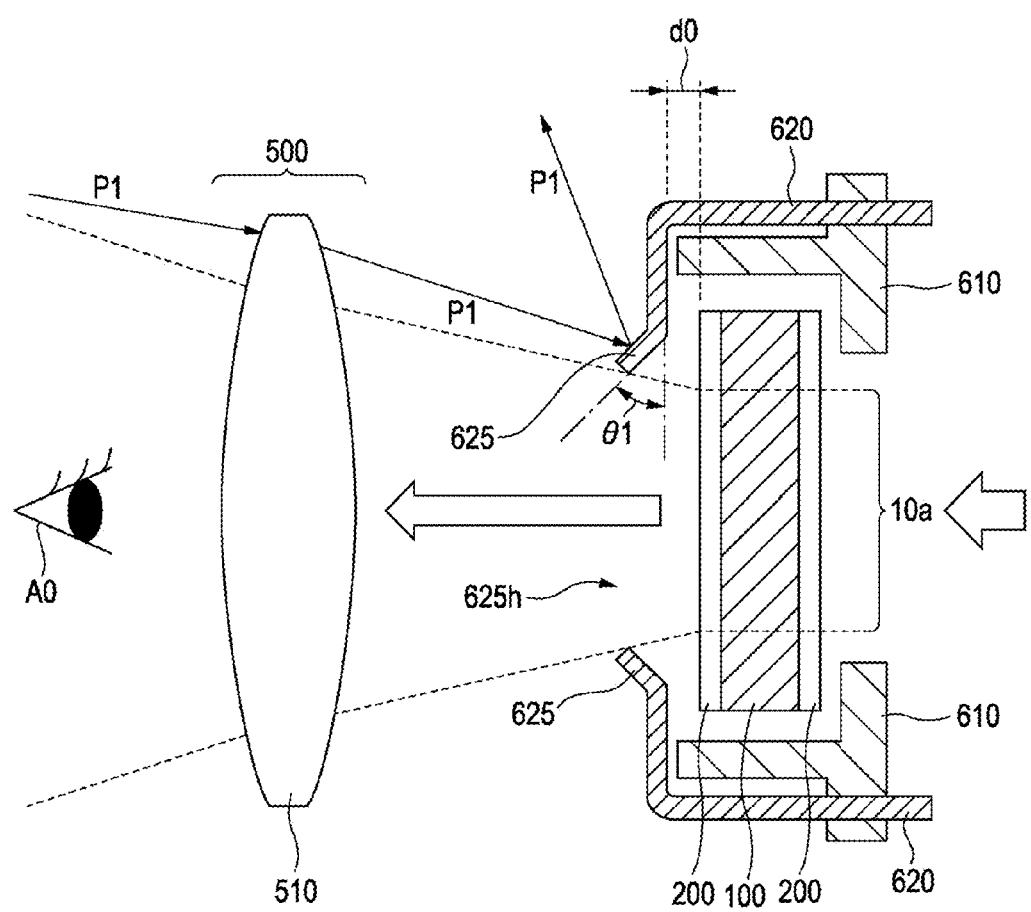
FIG. 5 is a schematic view schematically illustrating the configuration of the electronic view finder to which the liquid crystal device is applied.

FIG. 5 is a schematic view schematically illustrating the configuration of the electronic view finder to which the liquid crystal device is applied. The electronic view finder includes the above-described liquid crystal device and the ocular section 500 capable of enlarging a display image of the liquid crystal device. In FIG. 5, the frame 610 accommodating the liquid crystal panel 100 and the optical member 200 and the hook 620 mounted on the frame 610 in the mounting case 600 are illustrated as major elements of the liquid crystal device shown in FIG. 4.

As described above in the liquid crystal device with reference to FIG. 4, the light supplied from the backlight unit 800, as indicated by the white arrow of FIG. 5, is modulated in each pixel of the liquid crystal panel 100 to exit as the display light from the window 625*h*. The display light from the liquid crystal device is incident on the ocular section 500 and exits from the ocular lens 510. At this time, the imaging picture as the display image of the liquid crystal device is enlarged in the ocular section 500. Accordingly, an observer A0 is able to view the display image.

In particular, the light-shielding section 625 is provided in the hook 620 in this embodiment. The light-shielding section 625 made of a material which has a light-shielding property capable of shielding light is formed on a light exiting surface of the display light of the liquid crystal panel 100 at least partially along the circumference of the image display area 10*a*.

Figure 6:
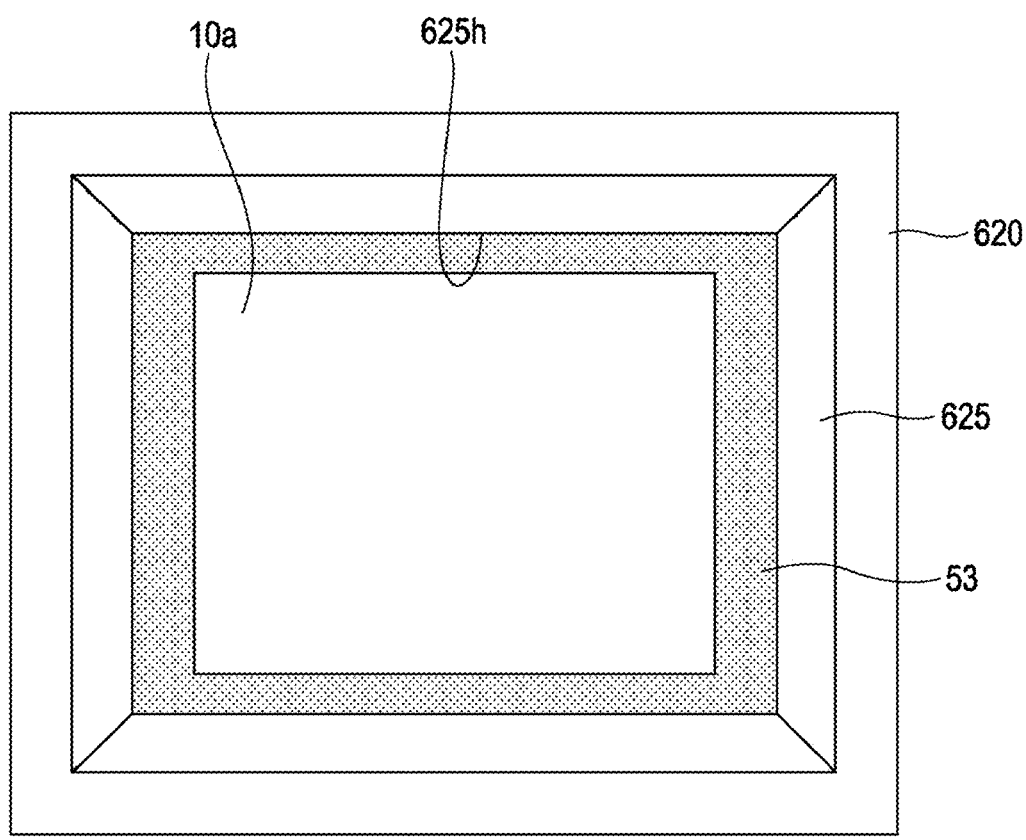
FIG. 6 is a plan view illustrating a dispositional relation between a light-shielding section and a frame light-shielding film of a liquid crystal panel in a state where the liquid crystal panel is accommodated in the mounting case.

FIG. 6 is a plan view illustrating a dispositional relation between the light-shielding section and the frame light-shielding film of the liquid crystal panel in a state where the liquid crystal panel is accommodated in the mounting case. The light-shielding section 625 at least partially defining the window 625*h* of the hook 620 is disposed in the outer periphery of the frame light-shielding film 53 of the liquid crystal panel 100 accommodated in the frame 610 outside the image display area 10*a*. In this embodiment, the light-shielding section 625 defines the whole window 625*h* of the hook 620, for example.

As described with reference to FIGS. 2 and 3, the image display area 10*a* to which the display light exits and which defines the area of the display image is defined by the frame light-shielding film 53 in the liquid crystal panel 100. In the outer periphery of the frame light-shielding film 53 outside the image display area 10*a*, the light-shielding section 625 defines the window 625*h* through which the display light can exit. Accordingly, in the hook 620, it is possible to display the display image in a broader area without narrowing the area through which the display light from the liquid crystal panel 100 can exit.

In FIG. 5, the display light exits from the liquid crystal panel 100 through the ocular lens 510 in the electronic view finder. However, as indicated by an arrow P1 of FIG. 5, for example, light may enter the liquid crystal panel 100 through the ocular lens 510 in a direction opposite to a display light traveling direction on a side of the observer. In addition, the arrow P1 of FIG. 5 indicates an example of a direction in which light coming from the observer A0 through the ocular section 500 travels.

In particular, in this embodiment, the light-shielding section 625 protrudes so as to be inclined with respect to the light exiting surface of the display light of the liquid crystal panel 100 toward the inner circumference of the image display area 10*a*, as shown in FIG. 4 or 5. Accordingly, the light coming from the observer A0 through the ocular lens 510 can be shielded by the light-shielding section 625 by reflecting the light, for example. For example, the light coming from the observer A0 in the light-shielding section 625 can be reflected by changing a traveling direction oriented from the outer circumference of the image display area 10*a* to the inner circumference thereof in the liquid crystal panel 100 into a direction which is different from that of the liquid crystal panel 100 in the light-shielding section 625 inclined at a predetermined angle θ [°] with respect to the light exiting surface of the liquid crystal panel 100 and in which the light travels toward the outside of the image display area 10*a*, as indicated by the arrow P1 of FIG. 5.

It is preferable that a reflection surface which at least comes in contact with the outside of the liquid crystal device and from which the light coming from the observer A0 is reflected, as described above, in the light-shielding section 625 has reflexibility lower than that of the frame 610. Specifically, it is preferable that the reflexibility is reduced by painting the surface of the light-shielding section 625 (or the whole hook 620) made of, for example, metal with opaque black, for example. In this way, it is possible to prevent the problem that it is difficult for the observer A0 to view the imaging picture because most of the light reflected from the light-shielding section 625 in the electronic view finder is again reflected.

Here, the ocular section 500 is formed so as to allow the ocular lens 510 to enlarge the display image to the observer A0 by the display light of the liquid crystal panel 100 and to focus the light incident from the observer A0. A light focusing operation by the ocular lens 510 is determined by an f value. The light entering the ocular section 500 from the observer A0 is focused by the ocular lens 510, as indicated by the arrow P1 of FIG. 5, and travels to the liquid crystal panel 100 toward the inner circumference of the image display area 10*a*.

In this embodiment, it is preferable that the inclined angle θ [°] of the light-shielding section 625 with respect to the light exiting surface of the liquid crystal panel 100 is adjusted in accordance with the f value of the ocular lens 510 so as to at least partially shield the light coming from the observer A0 and focused by the ocular lens 510. In this way, it is possible to shield the light focused by the ocular lens 510 and traveling to the liquid crystal panel 100 at an angle incident based on the light focusing operation determined with the f value by more surely reflecting the light from the inclined surface of the light-shielding section 625, for example. Moreover, it is possible to more surely allow the reflected light to travel in the direction which is different from that of the liquid crystal panel 100 and in which the light travels outside the image display area 10*a*.

In this embodiment, it is preferable that the inclined angle θ [°] of the light-shielding section 625 is 30° or less. When the inclined angle θ [°] of the light-shielding section 625 is larger than 30°, the light coming from the observer A0 may not be effectively shielded in the light-shielding section 625. Moreover, even when the light is reflected from the light-shielding section 625, a larger amount of the light may travel into the image display area 10*a*.

In this embodiment, however, it is possible to more surely reduce the light coming from the observer A0 and being incident on the image display area 10*a* of the liquid crystal panel 100. Accordingly, it is possible to prevent the large amount of light from being considerably reflected to the degree that the observer A0 can view the light coming from the observer A0 in the display area of the liquid crystal panel 100. As a consequence, the observer A0 can take a picture through the electronic view finder 3200 of the digital camera 3000 described with reference to FIG. 1, while viewing the exact imaging picture in the liquid crystal device.

In this embodiment, since the light-shielding section 625 is provided as a part of the hook 620 included in the mounting case 600, it is possible to simplify the configuration of the mounting case 600 and more easily manufacture the mounting case 600, compared to a configuration in which the light-shielding section 625 is provided separately from the mounting case 600 (that is, the light-shielding section 625 is provided separately from the frame 610 and the hook 620). Moreover, the hook 620 formed of a plate-shaped member (typically, plate-shaped metal), for example, can have a more simple configuration for the frame 610 having the above-described box-like shape and the light-shielding section 625 can be formed by processing a part of the hook 620. Accordingly, it is possible to further simplify the configuration of the mounting case 600, compared to the case where the light-shielding section 625 is provided in the frame 610. Moreover, it is possible to more simply manufacture the liquid crystal device, while more easily miniaturizing the liquid crystal device.

As shown in FIG. 5, it is preferable that the optical members 200 are disposed so that a gap d0 is formed between the optical member 200 and the hook 620 or the frame 610 in the mounting case 600. With such a configuration, it is possible to more effectively prevent damage or distortion from occurring because the polarizing plate for polarizing the light incident on or exiting from the liquid crystal panel 100 or the phase difference plate for correcting the phase difference comes in contact with the inner wall of the mounting case 600 and thus stress is added. As a consequence, it is possible to more surely prevent display failure such as display irregularity from occurring in the display image of the liquid crystal device due to the damage or the deformation of the optical members 200.

The invention is applicable to a reflective liquid crystal device (LCOS) forming elements on a silicon substrate, a plasma display (PDP), an electrolysis emission display (FED, SED), an organic EL display, a digital micro mirror device (DMD), an electrophoretic device, and the like in addition to the liquid crystal device described in this embodiment.

The invention is applicable to various electronic apparatuses such as a video camera, a television, a cellular phone, a POS terminal, a touch panel, and a projector in addition to the digital camera having the above-described electronic view finder.

The invention is not limited to the above-described embodiment, but may be modified in various forms without the gist and spirit of the invention understood from claims and this specification. In addition, an electro-optic device and an electronic apparatus made by these modifications are also included in the technical scope of the invention.

What is claimed is:

1. An electro-optic device comprising:
   an electro-optic panel which has a pixel area where a plurality of pixels are arranged;
   an ocular lens that enlarges an image displayed by the electro-optic panel, the ocular lens having a diameter larger than a width of the pixel area; and
   a light-shielding section formed on a side of a light exiting surface of the electro-optic panel along at least a part of the circumference of the pixel area, the light-shielding section being disposed between the electro-optic panel and the ocular lens, the light-shielding section including an inclined surface extending from a region outside the circumference of the pixel area obliquely toward the pixel area and away from the light exiting surface of the electro-optic panel such that a portion of light passing through the ocular lens toward the electro-optic panel is intercepted by the light-shielding portion.

2. The electro-optic device according to claim 1,
   wherein the electro-optic panel has a light-shielding film formed in a frame shape in the circumference of the pixel area, and
   wherein in the outer periphery of the light-shielding film outside the pixel area, the light-shielding section at least partially defines a window through which display light exits to correspond to the pixel area.

3. The electro-optic panel according to claim 1, further comprising:
   a mounting case which accommodates the electro-optic panel by surrounding the circumference of the electro-optic panel,
   wherein the light-shielding section is formed as a part of the mounting case.

4. The electro-optic device according to claim 3,
   wherein the mounting case includes a first holding member having an opening section surrounding the electro-optic panel and a second holding member mounted in the first holding member so as to cover the opening section, and
   wherein the light-shielding section is formed as a part of the second holding member.

5. The electro-optic device according to claim 4, further comprising:
   an optical member which is accommodated in the mounting case and at least partially forms a predetermined optical system for light incident on and exiting from the electro-optic panel,
   wherein the optical member is disposed such that a gap is formed between the optical member and the mounting case.

6. The electro-optic device according to claim 3,
   wherein the mounting case includes a first member having a concave portion accommodating the electro-optic panel and a second member disposed between the electro-optical panel and the ocular lens, the second member having a reflexibility lower than the first member, and
   wherein the light-shielding section is formed as a part of the second member.

7. The electro-optic device according to claim 1, wherein the light-shielding section is inclined at an angle of 30° or less with respect to the light exiting surface.

8. An electronic apparatus comprising the electro-optic device according to claim 1.

* * * * *